Figure 1:
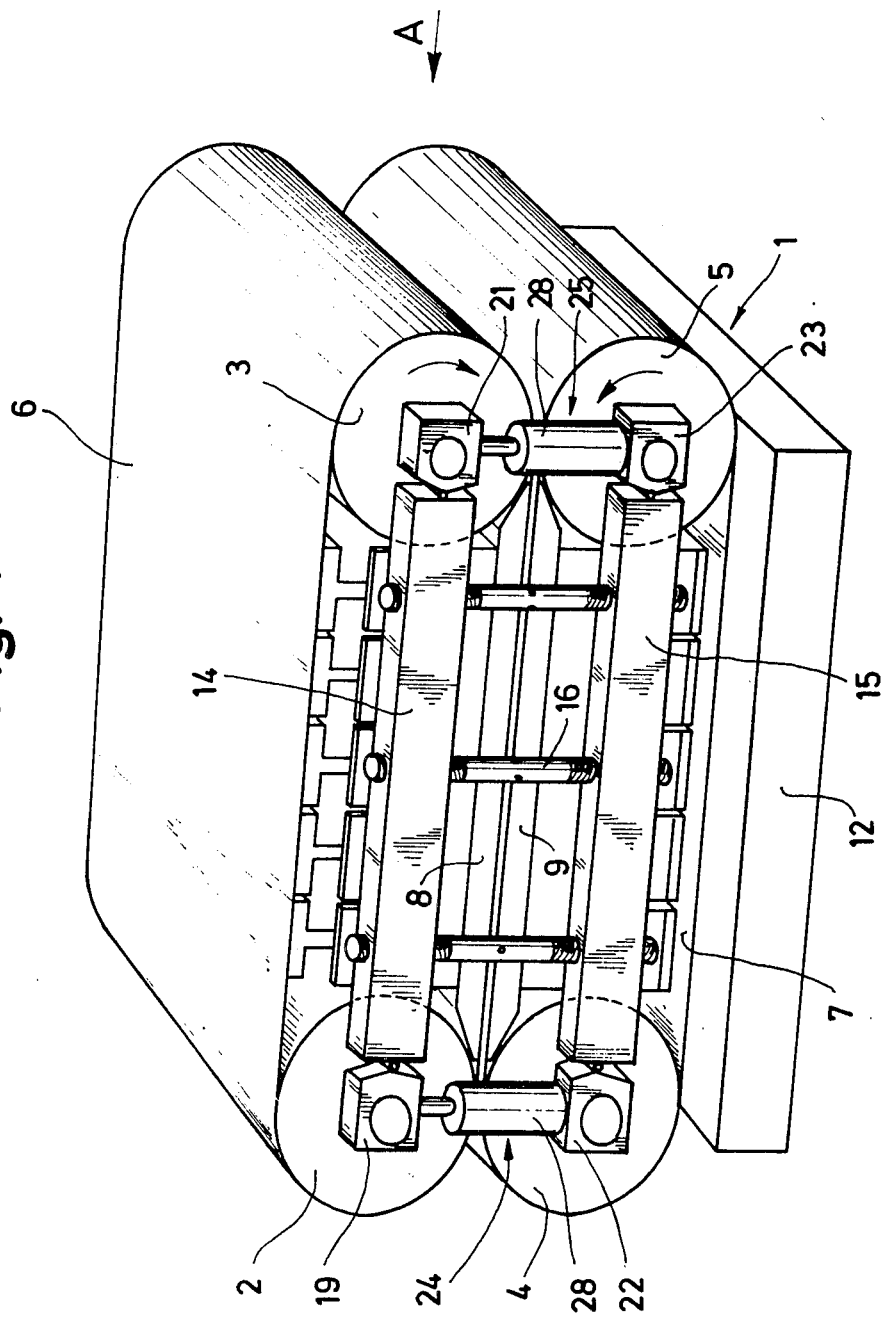

United States Patent [19]

Held

[11] Patent Number: 4,619,195
[45] Date of Patent: Oct. 28, 1986

[54] DUAL-BELT PRESS FOR A CONTINUOUSLY ADVANCING WEB OF MATERIAL

[76] Inventor: Herr K. Held, Alte Strasse 1, 7218 Trossingen 2, Fed. Rep. of Germany

[21] Appl. No.: 691,688

[22] Filed: Jan. 15, 1985

[30] Foreign Application Priority Data

Jan. 27, 1984 [DE] Fed. Rep. of Germany ....... 3402751

[51] Int. Cl.$^4$ .............................................. B30B 5/06
[52] U.S. Cl. ................................. 100/154; 156/583.5; 427/371
[58] Field of Search ...................... 100/153, 154, 93 R, 100/118, 119, 120, 150, 151, 152; 425/371; 156/583.5, 583.1

[56] References Cited

U.S. PATENT DOCUMENTS

| 3,521,552 | 7/1970 | Knapp | 100/154 X |
| 3,587,451 | 6/1971 | Luthi | 100/154 |
| 3,971,310 | 7/1976 | Kondos et al. | 100/118 |
| 4,034,904 | 7/1977 | Juditzki | 100/154 X |
| 4,218,970 | 8/1980 | Tutschek et al. | 100/154 X |

FOREIGN PATENT DOCUMENTS

| OS2105575 | 8/1972 | Fed. Rep. of Germany . |
| OS2534939 | 3/1976 | Fed. Rep. of Germany . |
| AS2641174 | 9/1977 | Fed. Rep. of Germany . |

Primary Examiner—Peter Feldman
Attorney, Agent, or Firm—Neuman, Williams, Anderson & Olson

[57] ABSTRACT

The invention relates to a dual-belt press for a continuously advancing web of material comprising a rigid press frame, deflection drums mounted for rotation on bearing bridges of the press frame, upper and lower endless press belts guided over the deflection drums and pressure plates disposed at the rear sides of the press belts for exerting pressure on the web of material. So that the web of material may be simultaneously calendered in such a press, at least those deflection drums provided on the entry side of the press are mounted for movement relative to the pressure plates and are adapted to be tensioned against one another by adjusting means such that the pressure exerted in the gap between these drums (calendering) is preferably greater than and independent of the pressure exerted by the pressure plates.

5 Claims, 3 Drawing Figures

DUAL-BELT PRESS FOR A CONTINUOUSLY ADVANCING WEB OF MATERIAL

The invention relates to a dual-belt press for a continuously advancing web of material comprising a rigid press frame, deflection drums mounted for rotation on bearing bridges of the press frame, upper and lower endless press belts guided over the deflection drums and pressure plates disposed at the rear sides of the press belts for exerting pressure on the web of material.

With dual-belt presses of this type, webs of material, for example in the form of decorative, multi-layered laminates, chipboards, fibreboards, plywood sheets and electrolaminates, may be continuously pressed to form finished products under the effect of heat.

It is known to arrange special calibrating rollers in front of the entry side to the dual-belt press in order to apply nip effects to the web of material before it enters the reaction zone of the press, i.e. to calender the material to be pressed. A calender arranged in front of the dual-belt press entails additional costs and resources with respect to apparatus and considerably increases the total length of such apparatus. The object of the invention is to design a dual-belt press in which the web of material may be calendered as well without any appreciable increase in costs or apparatus.

The object of the invention is accomplished in that at least those deflection drums provided on the entry side of the press are mounted for movement relative to the pressure plates and are adapted to be tensioned against one another by adjusting means such that the pressure exerted in the gap or nip of these drums (calendering) is preferably greater than and independent of the pressure exerted by the pressure plates.

Figure 2:
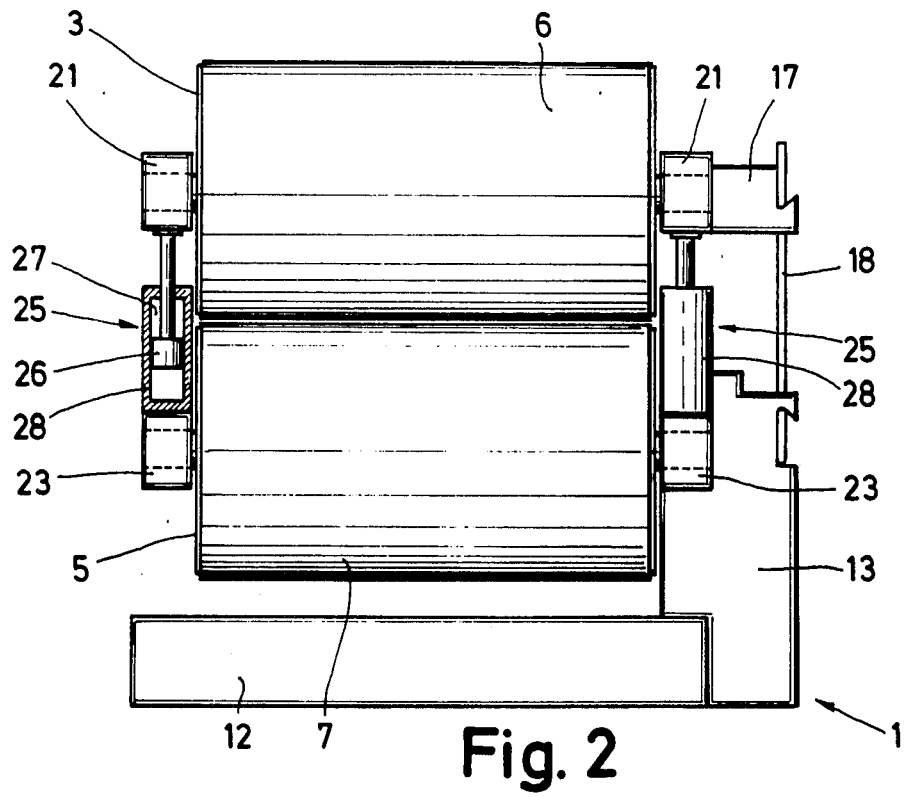
Figure 3:
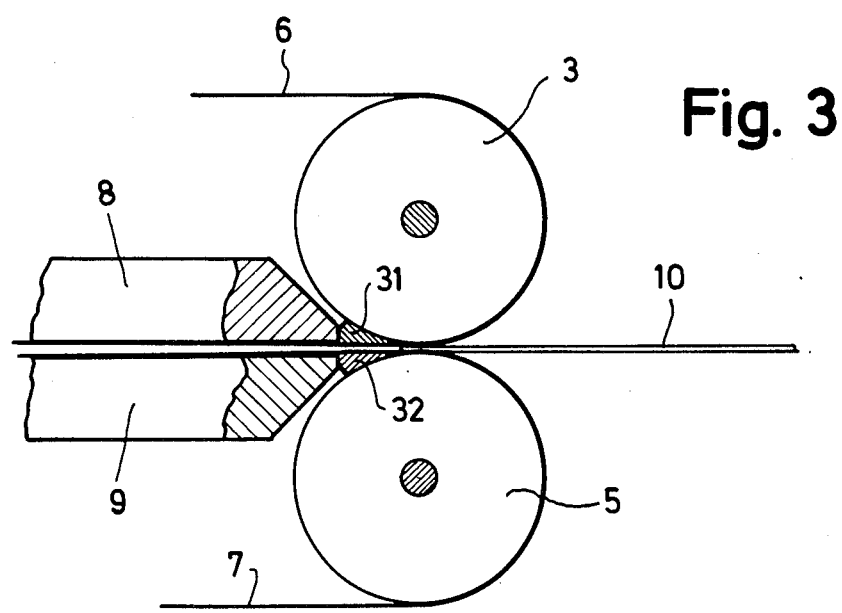

The following description of a preferred embodiment of the invention serves to explain the invention in greater detail in conjunction with the attached drawings, in which FIG. 1 shows a schematic side view of a dual-belt press;

FIG. 2 is a schematic view of the entry side to the dual-belt press, seen in the direction of arrow A in FIG. 1 and FIG. 3 is a schematic view showing a detail at the nip of the deflection drums on the entry side of the press.

The dual-belt press illustrated schematically in FIG. 1 has four deflection drums 2, 3, 4 and 5 mounted for rotation on a press frame 1. An upper endless press belt 6 extends around drums 2, 3 and a lower endless press belt 7 around drums 4, 5. The press belts 6, 7 may consist of metal, preferably stainless steel, and comprise one or more layers. The direction of travel of the belts 6, 7 is indicated by the arrows in the deflection drums 3, 5. The drums 3, 5 mounted at the entry side to the apparatus are heated in the manner known per se, for example by a heated thermo-oil. The amount of pressure to be exerted on a web of material (not illustrated) fed between the drums 3, 5 at the entry side of the press is transferred from pressure plates 8, 9 to the rear sides of the facing strands of the press belts 6 or 7 and thereby to the web of material continuously advancing therebetween. The pressure plates 8, 9 are heated, for example by thermo-oil circulating in them. Those sections of the pressure plates 8, 9 located towards the delivery side of the press may also be cooled, along with the deflection drums 2, 4 mounted at this side.

As is apparent from the schematic illustration in FIG. 2, the press frame 1 comprises a stationary bottom plate 12 to which two uprights 13 are rigidly connected. A bearing arrangement for the deflection drums 2, 3, 4, 5 is cantilevered to the uprights 13. This bearing arrangement consists essentially of bearing bridges 14, 15 arranged in pairs. Each pair of bearing bridges is connected by height-adjustable spindles 16 which serve to adjust the height of the reaction zone between the press belts 6, 7 in the region of the pressure plates 8, 9. The two bearing bridges 15 are mounted on the upright 13 (FIG. 2) in a cantilever manner. The bearing bridges 14 are supported on the bearing bridges 15 via the spindles 16. The arrangement formed by these bearing bridges is connected under tension to the upright 13 via arms 17 (FIG. 2) which protrude from the upper bearing bridges 14 and via tensile coupling members 18. This results in an altogether stable, cantilever arrangement. As shown in FIG. 1, bearing blocks 19, 21 and 22, 23 are articulatedly attached to the bearing bridges 14, 15 so as to be movable towards and away from one another with a motional component directed perpendicularly to the main plane of the press belts 6, 7. The shafts of the deflection drums 2, 3, 4 and 5 are mounted in these bearing blocks 19, 21, 22, 23. This means that the deflection drums are also displaceable relative to one another and to the pressure plates 8, 9 stationarily mounted on the frame. The bearing blocks 19, 22 and 21, 23 are engaged by adjusting members in the form of piston-cylinder units 24 and 25 actuated by pressure medium. When a pressure medium, e.g. hydraulic fluid, impinges on the chamber 27 of the cylinder 28 located above the piston 26, the deflection drums 3, 5 are tensioned against one another and exert considerable pressure between the press belts 6, 7 in the region of the nip and this pressure may be utilized to calender the web of material fed to the press. The pressure thus exerted is greater than that between the pressure plates 8, 9 and may be utilized to produce certain effects in the web of material which is, for example, impregnated with resin. This eliminates the necessity of a special pair of calendering rollers placed in front of the dual-belt press.

The piston-cylinder units engaging on the left-hand and right-hand end faces of the deflection drums 2, 3, 4 and 5 may have pressure medium acting on them independently of one another so that the pressure exerted in the nip increases or decreases along the drum axes. This may be utilized, for example, to adjust the distribution of resin in a web of material fed to the press.

The pressure to be exerted in the gap between two superposed deflection drums may be made dependent on a continuous spacing measurement. A desired spacing value is specified and the pressure then regulated as a function of measured spacing values. It is also possible to regulate the pressure to be exerted as a function of the pressure in the piston-cylinder units 24, 25. In this way, the material to be pressed in the gap between the drums may be influenced to a high degree of accuracy.

Means, for example pressure cylinders, are provided on the bearing bridges 14, 15 in a manner known per se and therefore not illustrated for the purpose of altering the spacing between the deflection drums associated with the respective bearing bridges to produce tension in the press belt extending around these drums. Since this tensional force acts practically at right angles to the pressure force exerted by the piston-cylinder units 24, 25, these forces cannot interfere with one another.

At the delivery side of a nip serving to calender material, the web of material thus treated sometimes exhibits undesired spring-back effects. In order to counteract such effects, slide wedges 31, 32 may be disposed, as shown schematically in FIG. 3, between the pressure plates 8, 9 and the gap between the drums 3, 5 serving to calender the web of material. The wedges extend across the entire width of the drums and the web of material which is designated as 10 in FIG. 3. These slide wedges 31, 32 each have a flat side engaging on the rear sides of the press belts 6, 7 and a flank which is correspondingly curved to engage on the outer surface of the drums 3, 5. The wedges are pressed by the pressure plates into the gap between the drums 3, 5 and held firmly. It is also possible to have pressure members (not illustrated), for example in the form of hydraulic piston-cylinder units, disposed between the pressure plates 8, 9 and slide wedges 31 and 32. These pressure members press the slide wedges 31, 32 firmly into the gap between the drums and against the web of material. In this way, a considerable amount of pressure may be maintained between the gap of the drums 3, 5 and the pressure plates 8, 9 and this prevents any "springing back" of the web of material 10 calendered between the drums 3, 5. The slide wedges 31, 32 consist of metal and may also be designed to be heatable.

During practical operation of the invention, it will often be sufficient for calendering to be carried out merely at the entry side of the press between the deflection drums 3, 5. In this case, the deflections drums 2, 4 disposed at the delivery side of the press may be rigidly mounted, as previously, on the bearing bridges 14, 15 and the piston-cylinder units 24 provided for these drums in the embodiment illustrated are not required.

What is claimed is:

1. A dual-belt press for processing a continually advancing web of material, and having entry and delivery ends; said press comprising a rigid frame having upper and lower bearing bridges; two upper deflection drums and two lower deflection drums in underlying relation with said upper deflection drums whereby a gap is present between each upper and each underlying lower deflection drum; drum bearing blocks in which said deflection drums are rotatably mounted; said bearing blocks being articulately connected to such bearing bridges whereby said bearing blocks are movable toward and away from each other; upper and lower endless press belts movable over the upper and lower reflection drums respectively; pressure plates mounted on said frame and engageable with inner surface portions of said press belts moving between said deflection drums for exerting pressure on a web of material passing between said upper and lower deflection drums; and adjusting means connected to the bearing blocks for the deflection drums at least at the entry end of said press for controlling the interval therebetween whereby the pressure exerted in the gap defined by the press entry end drums is independent of the pressure exerted by the pressure plates.

2. The dual belt press of claim 1 in which adjusting means for adjusting the bearing blocks are disposed on opposite sides of the entry end deflection drums, and are actuatable independently of each other.

3. The dual belt press of claim 1 in which bearing blocks engage each upper and each lower deflection drum at opposed ends, and an adjusting means connects each upper bearing block of an upper deflection drum with a bearing block of an underlying deflection drum, in combination with means for independently actuating each adjusting means.

4. The dual-belt press of claim 1, 2 or 3 in which the adjusting means comprise piston and cylinder units.

5. The dual-belt press of claim 1, 2 or 3 in which slide wedges are disposed between the deflection drums and the pressure plates.

* * * * *